United States Patent [19]

Lahr et al.

[11] Patent Number: 4,858,306
[45] Date of Patent: Aug. 22, 1989

[54] APPARATUS FOR PULLING A PLURALITY OF FUEL RODS FROM A FUEL ELEMENT

[75] Inventors: Helfrid Lahr, Wedemark; Gerhard Betz, Alzenau, both of Fed. Rep. of Germany

[73] Assignee: Deutsche Gesellschaft für Wiederaufarbeitung von Kernbrennstoffen mbH, Hanover, Fed. Rep. of Germany

[21] Appl. No.: 169,625

[22] Filed: Mar. 18, 1988

[30] Foreign Application Priority Data

Apr. 8, 1987 [DE] Fed. Rep. of Germany ....... 3711844

[51] Int. Cl.⁴ .............................................. B23P 19/00
[52] U.S. Cl. .................................. 29/723; 29/402.08; 29/426.5; 29/726; 29/906; 252/627; 294/87.1; 294/906; 376/264; 414/146
[58] Field of Search ........................ 29/426.5, 723, 726, 29/906, 402.03, 402.08; 294/87.1, 906; 414/146, 741; 901/39; 376/264, 271, 446; 252/627

[56] References Cited

U.S. PATENT DOCUMENTS

| | | | |
|---|---|---|---|
| 66,695 | 12/1882 | Pomalbo et al. | 29/906 |
| 1,535,600 | 4/1925 | Goddu | 294/87.1 X |
| 3,125,800 | 3/1964 | Klima | 29/726 |
| 4,446,098 | 5/1984 | Pomaibo et al. | 29/906 X |
| 4,547,963 | 10/1985 | Ohmstede | 29/726 |
| 4,646,414 | 3/1987 | Wilson et al. | 29/723 X |
| 4,651,400 | 3/1987 | Shields | 29/723 X |
| 4,651,403 | 3/1987 | DeMario et al. | 29/723 X |
| 4,671,921 | 6/1987 | Foussard | 29/723 X |
| 4,687,245 | 8/1987 | Fourmanek | 294/87.1 |

*Primary Examiner*—Mark Rosenbaum
*Assistant Examiner*—Frances Chin
*Attorney, Agent, or Firm*—Walter Ottesen

[57] ABSTRACT

The invention is directed to an apparatus for pulling a plurality of fuel rods out of a fuel element structure and has a gripping device which is capable of clamping the fuel rods. To reliably pull the fuel rods from an irradiated nuclear reactor fuel element, the apparatus includes an upper guide rod and a lower tension rod which lie horizontally and are arranged one above the other. The rods extend through a plurality of clamping plates in a direction perpendicular to the latter. The clamping plates are mounted so as to be parallel to each other and spacers are arranged between each two mutually adjacent ones of the clamping plates. The spacers are arranged on both rods with the width of the spacers on the lower rod beign slightly less than the diameter of a fuel rod. The clamping plates are pressable together by means of a tensioning device. The apparatus of the invention enables the gripping device to be placed on the fuel element in a simple manner.

7 Claims, 1 Drawing Sheet

U.S. Patent    Aug. 22, 1989    4,858,306
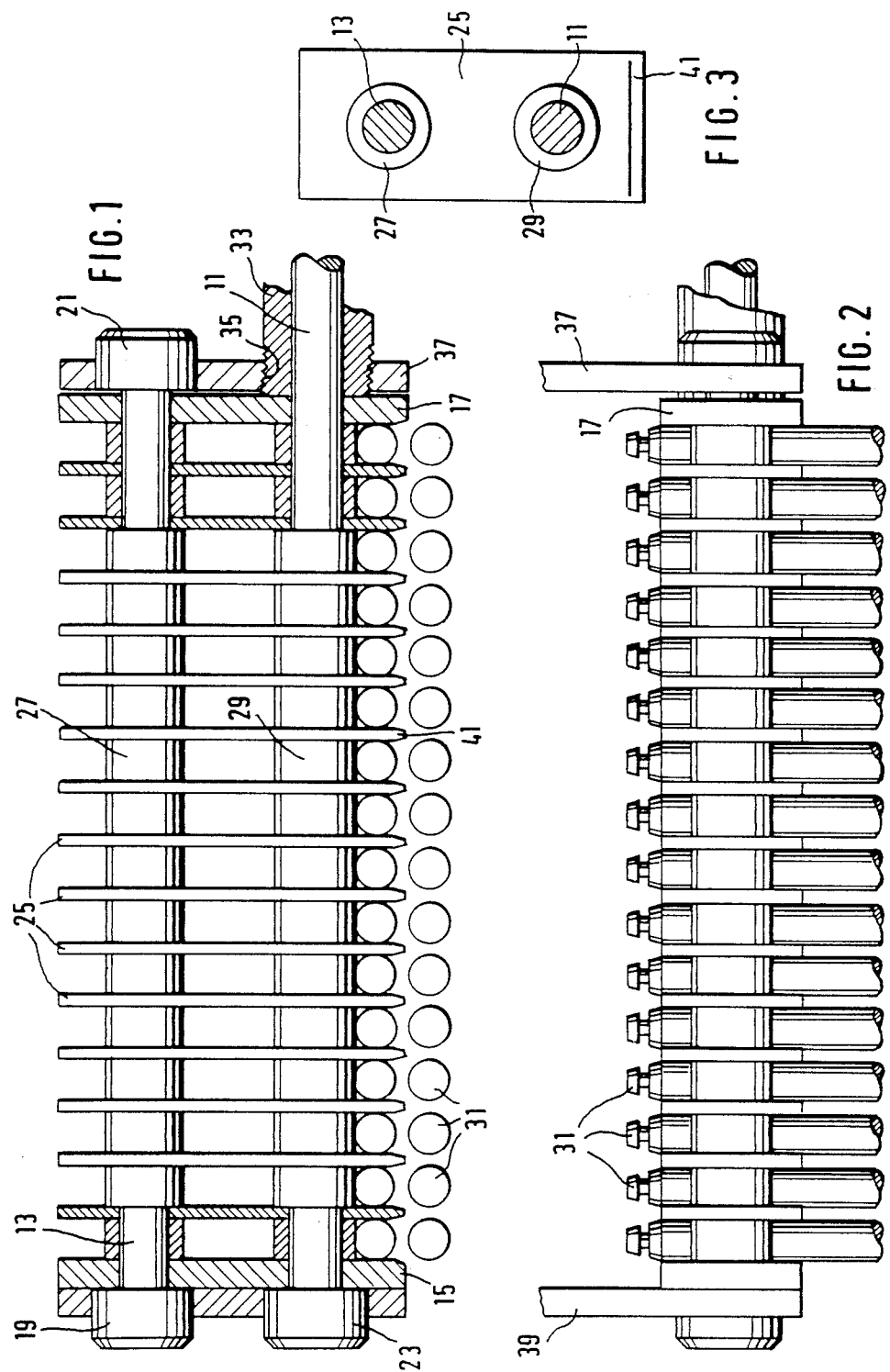

APPARATUS FOR PULLING A PLURALITY OF FUEL RODS FROM A FUEL ELEMENT

FIELD OF THE INVENTION

The invention relates to an apparatus for pulling a plurality of fuel rods from a fuel element with a comblike grasping device for grabbing the fuel rods.

BACKGROUND OF THE INVENTION

European patent publication No. 0 066 695 corresponds to U.S. Pat. No. 4,446,098 and U.S. patent application No. 268,311, filed on May 29, 1981, and discloses a spent fuel consolidation system wherein individual fuel rods can be withdrawn from a fuel element with the aid of a gripper mechanism. The gripper mechanism grasps the fuel rods at their respective longitudinal ends after the top piece and bottom piece of the fuel element have been cut therefrom. The gripper mechanism is guided over the vertically standing fuel element and includes a plurality of bores into which respective ends of the fuel rods are guided. The fuel rods are tightly clamped radially with respect to each other by means of a flexible intermediate piece disposed between two pressure plates when the latter are clamped together. The flexible intermediate member is made of plastic or rubber and is not adequately resistant or does not have a sufficiently long service life because of the radioactive radiation and the mechanical loading. The fuel rods are pulled up out of the fuel element after they are clamped. This apparatus requires a building having a sufficiently high top wall which must have a height of at least twice the length of a fuel rod. A substantial disadvantage of this arrangement is that the fuel rods must be guided into respective bores of the gripper mechanism. This can be difficult because of possible bent or deformed fuel rods, since this work must all be performed by means of remotely-manipulated equipment.

SUMMARY OF THE INVENTION

It is an object of the invention to provide an apparatus of the kind described above which provides a simple and certain grabbing of the fuel rods for pulling the latter out of the fuel element. It is a further object of the invention to provide such an apparatus wherein the remotely-controlled handling is assured and improved.

The apparatus according to the invention is for pulling out a plurality of fuel rods from the structure of a fuel element. The apparatus includes a plurality of mutually parallel clamping plates arranged one next to the other; an upper guide rod extends transversely through the clamping plates; a lower tension rod is parallel to the guide rod and likewise extends transversely through the clamping plates; a first plurality of spacers is mounted on the upper guide rod between corresponding ones of each two mutually adjacent ones of the clamping plates; a second plurality of spacers is mounted on the lower tension rod and likewise is disposed between corresponding ones of each two mutually adjacent ones of the clamping plates; each one of the second plurality of spacers has a width slightly less than the diameter of a fuel rod; tension means is provided for developing a force to press the plates together; and, structure means is provided for holding the apparatus during the application of the force to the clamping plates.

With the apparatus of the invention, the fuel rods of a row can be grabbed in an aligned manner and pulled out from the fuel element. For this purpose, the apparatus is seated on the fuel element in a direction perpendicular to the longitudinal axis thereof. In this way, the clamping plates enclose the fuel rods of the first or top row of the fuel element in a comb-like manner. The fuel rods are clamped between the clamping plates when the tensioning means is tightened. Gaps present in the fuel element matrix are compensated for by the spacer rings disposed between each two mutually adjacent ones of the camping plates. For manipulating the apparatus of the invention, the apparatus is provided with structure means at which the apparatus can be held stationary if the fuel element is to be moved during the pulling-out operation. On the other hand, the apparatus of the invention can be manipulatively held at the structure means and moved if it is the fuel element which is to remain stationary.

The apparatus according to the invention affords the significant advantage that it can be placed on the fuel element near the lattice plates of the fuel element. At this location, the spacing defined by means of the lattice structure is provided. A further significant advantage of the invention is that the remotely-controlled manipulation is facilitated and this manifests itself in that the clamping plates must not be precisely positioned when the apparatus is placed upon the fuel element because after the apparatus engages the round fuel rod surfaces, the clamping plates are guided into the clamping position along the periphery of these round surfaces.

Pursuant to a further embodiment of the invention, the downwardly extending end portions of the clamping plates are configured so as to be wedge-shaped. In this way, an improved guiding of the clamping plates into the gaps between the fuel rods is obtained.

In a further advantageous embodiment of the invention, pressure plates are mounted at the end regions of the upper and lower rods. These pressure plates define the ends of the clamping-plate arrangement which is provided on the two rods mounted one above the other. Each pressure plate is journalled on both rods. The clamping plates are clamped toward each other by pressing the pressure plates together in the region of the lower tension rod.

Pursuant to a further embodiment of the invention, the structure means of the apparatus includes a first tension bracket journalled on the respective left-hand ends of the rods and a second tension bracket journalled on the respective right-hand ends of the rods. These tension brackets hold the apparatus during the application of the force by the tensioning means. The tensioning brackets are connected to each other with a frame structure and provide the possibility of applying a pulling force to the apparatus to pull out the fuel rods. On the other hand, if the tension brackets are instead arranged at a stationary bearing location, the fuel element can be moved for pulling out the fuel rods.

With the invention, a fuel rod gripping arrangement suitable for remote manipulation is provided which has a self-centering capability. With the apparatus according to the invention, fuel rods can also be pulled out of a fuel element which is positioned horizontally and this affords advantages with respect to the building in which the apparatus according to the invention is utilized. Thus, it is not necessary to provide a building which has a top wall with a height twice the length of a fuel rod.

BRIEF DESCRIPTION OF THE DRAWINGS

The invention will now be described with reference to the drawings wherein:

FIG. 1 is a front elevation view, partially in section, of an apparatus according to the invention for pulling fuel rods out of a fuel element;

FIG. 2 is a top plan view of the apparatus of FIG. 1; and,

FIG. 3 is a side elevation view of a clamping plate.

DESCRIPTION OF THE PREFERRED EMBODIMENTS OF THE INVENTION

The apparatus according to the invention shown in FIG. 1 includes a lower tension rod 11 and a guide rod 13 arranged parallel and above the tension rod. The spacing between these two rods (11 and 13) is determined by two pressure plates (15 and 17) which are journalled on tension rod 11 and the guide rod 13 at the respective end regions thereof. The guide rod 13 has end heads (19, 21) at respective ends thereof having a diameter greater than a rod. The annular-shaped inner surface of each end head is in contact engagement with the neighboring pressure plate (15 or 17). The tension rod 11 has an end head 23 at one end thereof.

Vertical clamping plates 25 are arranged between the pressure plates 15 and 17 and are spaced at equal distances from each other. The clamping plates 25 are parallel to each other and are penetrated by both rods 11 and 13. Annular spacers (27, 29) are arranged between the clamping plates 25 with the spacers 27 being seated on the guide rod 13 and having a width corresponding to the diameters of the fuel rods to be grabbed. On the other hand, the spacers 29 on the lower tension rod 11 have a width which is slightly less than the diameter of the fuel rods 31.

The apparatus includes a threaded spindle 33 disposed outside of the clamping plate arrangement 25 at the right- hand end of the tension rod 11. The threaded spindle 33 is guided on the end of the tension rod 11 as shown and threadably engages an internal winding 35 of a tension bracket 37 journalled on the limit head 21 of the guide rod 13. In lieu of the threaded spindle 33, it is also possible to seat a remotely-manipulable nut on the tension rod 11 which must then have an outer winding in this region.

A further tension bracket 39 is provided on the left-hand end of the apparatus which is journalled on the end heads 19 and 23 of the guide rod 13 and tension rod 11, respectively. The two tension brackets 37 and 39 can be rigidly connected to each other by a rigid frame (not shown).

The clamping plates 25 have a rectangular profile when viewed in side elevation as shown in FIG. 3. The clamping plates 25 have respective lower end portions configured as wedge-shaped edge portions.

As shown in the drawing, the clamping plates 25 are brought into a position between the fuel rods 31 of a fuel element. The fuel rods 31 are in a row one next to the other and by tensioning the two pressure plates (15, 19), the clamping plates can be tightly clamped together at the location of the fuel rods.

The operation of the apparatus of the invention is described in the following.

After the bottom piece and top piece of a fuel element have been separated and the fuel element has been fixed in position horizontally, a manipulator, which holds the fuel rod gripping assembly at an appropriate structure thereof, brings the gripping assembly to the fuel element and seats it thereon. The fuel-rod clamping apparatus is centered by means of the wedge-shaped end portions 41 of the clamping plates 25 which can slide into their positions on the periphery of the fuel rods 31.

The threaded spindle 33 is rotated inwardly via a remotely-manipulated impact wrench so that the two pressure plates (15 and 17) are clamped toward each other. In this way, the entire package of clamping plates 25 is tensioned and clamps the fuel rods 31 lying in the respective intermediate spaces defined by each two mutually adjacent ones of the clamping plates 25. If the fuel element is held stationery, then a manipulator grasps the apparatus at a bar interconnecting the tension brackets (37, 39) and pulls the fuel rods 31 in their axial direction to pull the latter out of the structure of the fuel element. On the other hand, the apparatus according to the invention can be held tightly in place and the fuel element can be pulled so as to separate the clamped fuel rods 31 from the fuel element structure. After loosening the apparatus by rotating the threaded spindle 33 in the opposite direction, the fuel rods 31 pulled out from the fuel element are released from the apparatus and can be stored. The apparatus is then ready to separate a further set of fuel rods from the fuel element.

It is understood that the foregoing description is that of the preferred embodiments of the invention and that various changes and modifications may be made thereto without departing from the spirit and scope of the invention as defined in the appended claims.

What is claimed is:

1. An apparatus for withdrawing a plurality of fuel rods out of a fuel element in which the fuel rods are supported, the fuel rods each having a predetermined diameter, the apparatus comprising:

a plurality of mutually parallel clamping plates arranged one next to the other;

an upper guide rod extending transversely through said plates;

a lower tension rod parallel to said guide rod and likewise extending transversely through said plates;

a first plurality of spacers mounted on said upper guide rod between corresponding ones of each two mutually adjacent ones of said clamping plates;

a second plurality of spacers mounted o said lower tension rod likewise between corresponding ones of each two mutually adjacent ones of said clamping plates;

each of said second plurality of spacers having a width slightly less than the predetermined diameter of one of the fuel rods;

tensioning means for developing a force to press said plates together; and, structure means for holding said apparatus during the application of said force to said plates.

2. The apparatus of claim 1, said tension rod defining a longitudinal axis and said clamping plates being perpendicular to said rods; and, said tensioning means being mounted on said tension rod so as to apply said force in the direction of said longitudinal axis.

3. The apparatus of claim 1, each of said plates having a wedge-shaped lower end portion.

4. The apparatus of claim 1, a first pressure mounted on the left-hands of said rods and a second pressure plate mounted on the right-hand ends of said rods.

5. The apparatus of claim 1, said structure means comprising a first tension bracket journalled on the respective left-hand ends of said rods and a second tension bracket journalled on the respective right-hand ends of said rods for holding said apparatus during the application of said force.

6. An apparatus for withdrawing a plurality of fuel rods out of a fuel element in which the fuel rods are supported, the fuel rods each having a predetermined diameter, the apparatus comprising:

a plurality of mutually clamping plates arranged one next to the other;

an upper guide rod extending perpendicularly through said plates;

a lower tension rod parallel to said guide rod and likewise extending perpendicularly through said plates;

a plurality of first spacers mounted on said upper guide rod between corresponding ones of each two mutually adjacent ones of said clamping plates;

a plurality of second spacers mounted on said lower tension rod likewise between corresponding ones of each two mutually adjacent ones of said clamping plates;

said lower tension rod defining a longitudinal axis;

each one of said second spacers having a width measured in the direction of said axis which is slightly less than the predetermined diameter of one of the fuel rods;

said plates having respective lower end portions and each two mutually adjacent ones of said lower end portions and the second spacer disposed therebetween conjointly defining a U-shaped opening for receiving one of the fuel rods therein; and, tensioning means for developing a force in the direction of said axis to press said plates together so as to tightly grab respective fuel rods between each two mutually adjacent ones of said end portions.

7. The apparatus of claim 6, said tensioning means comprising: a first pressure plate mounted on the left-hand ends of said rods and a second pressure plate mounted on the right-hand ends of said rods; and a member mounted on said tension rod for applying a force along said axis to pull said pressure plates toward each other and press said clamping plates together.

* * * * *

UNITED STATES PATENT AND TRADEMARK OFFICE
CERTIFICATE OF CORRECTION

PATENT NO. : 4,858,306

DATED : August 22, 1989

INVENTOR(S) : Helfrid Lahr and Gerhard Betz

It is certified that error appears in the above-identified patent and that said Letters Patent is hereby corrected as shown below:

Title page:

In the Abstract, line 14, delete "beign" and substitute -- being -- therefor.

In column 2, line 10, delete "camping" and substitute -- clamping -- therefor.

In column 4, line 46, delete "o" and substitute -- on -- therefor.

In column 4, line 64, insert -- plate -- between "pressure" and "mounted".

In column 4, line 65, delete "left-hands" and substitute -- left-hand ends -- therefor.

UNITED STATES PATENT AND TRADEMARK OFFICE
CERTIFICATE OF CORRECTION

PATENT NO. : 4,858,306

DATED : August 22, 1989

INVENTOR(S) : Helfrid Lahr and Gerhard Betz

It is certified that error appears in the above-identified patent and that said Letters Patent is hereby corrected as shown below:

In column 5, line 9, insert -- parallel -- between "mutually" and "clamping".

In column 6, line 18, insert a comma between "and" and "a".

Signed and Sealed this

Twenty-ninth Day of May, 1990

*Attest:*

HARRY F. MANBECK, JR.

*Attesting Officer*    *Commissioner of Patents and Trademarks*